United States Patent [19]
Harker

[11] Patent Number: 5,940,557
[45] Date of Patent: Aug. 17, 1999

[54] OPTICAL FIBRE MICROLENS AND OPTICAL RADIATION SOURCE EMPLOYING THE SAME

[75] Inventor: Andrew Thomas Harker, Suffolk, United Kingdom

[73] Assignee: Hewlett-Packard Company, Palo Alto, Calif.

[21] Appl. No.: 08/892,961

[22] Filed: Jul. 16, 1997

[30] Foreign Application Priority Data

Jul. 30, 1996 [EP] European Pat. Off. .............. 96305605

[51] Int. Cl.$^6$ .............................. G02B 6/25; G02B 6/32
[52] U.S. Cl. ................................. 385/33; 385/79
[58] Field of Search ................. 385/33, 35, 93, 385/79; 372/6; 219/121–69

[56] References Cited

U.S. PATENT DOCUMENTS

| | | |
|---|---|---|
| 4,766,705 | 8/1988 | Dholakia . |
| 5,011,254 | 4/1991 | Edwards et al. ........................ 385/33 |
| 5,074,682 | 12/1991 | Uno et al. ................................ 385/33 |
| 5,256,851 | 10/1993 | Presby ............................... 219/121.69 |
| 5,455,879 | 10/1995 | Modavis et al. ....................... 385/33 |
| 5,485,481 | 1/1996 | Ventrudo et al. .......................... 372/6 |
| 5,500,911 | 3/1996 | Roff ........................................ 385/33 |

FOREIGN PATENT DOCUMENTS

| | | |
|---|---|---|
| 0063504 | 10/1982 | European Pat. Off. ............... 385/33 |
| 558230A1 | 9/1993 | European Pat. Off. . |
| 3207988A1 | 9/1983 | Germany . |
| 3910711A1 | 10/1990 | Germany . |
| 4404525C1 | 2/1995 | Germany . |
| 57-150810 | 9/1982 | Japan . |
| 60-153010 | 8/1985 | Japan . |
| 0109313 | 10/1987 | Japan ..................................... 385/33 |
| 63-228107 | 9/1988 | Japan . |
| 1270011 | 10/1989 | Japan . |
| WO96/08738 | 3/1996 | Japan . |

OTHER PUBLICATIONS

Russo et al, Lens–ended fibers for medical applications: a new fabrication technique, Applied Optics vol. 23, No. 19, pp. 3277–3283, Oct. 01, 1984.

European Search Report, EP 96 30 5605, Feb. 01, 1997.

*Primary Examiner*—John D. Lee
*Assistant Examiner*—Juliana K. Kang

[57] ABSTRACT

Embodiments of the present invention provide optical fibre microlenses having anamorphic focusing means which have a major axis which is not perpendicular to the longitudinal axis of the optical fibre. In particular, a wedge-shaped optical fibre microlens whose tip is skewed with respect to the longitudinal axis of the optical fibre, is described. Such optical fibre microlenses find particular application in coupling light from semiconductor lasers having asymmetrical output radiation patterns, since they increase the coupling efficiency and reduce the level of back reflection from the microlens to the laser. This is of particular importance for semiconductor lasers used to pump optical fibre amplifiers.

23 Claims, 9 Drawing Sheets

OPTICAL FIBRE MICROLENS AND OPTICAL RADIATION SOURCE EMPLOYING THE SAME

The present invention relates to the coupling of optical radiation into an optical fibre, and in particular to an optical fibre microlens and to a source of optical radiation employing the same.

Two key aspects in the coupling of optical radiation from a semiconductor laser diode to an optical fibre are the efficiency of the coupling, and the level of back reflection of radiation from the optical fibre to the laser diode. Various techniques are known for reducing the level of back reflection, or for increasing the coupling efficiency. A known technique for reducing the level of back reflection is to arrange for the optical radiation to strike the fibre end face at an angle other than 90° C., either by tilting the optical fibre with respect to the laser diode, or by polishing the end face of the optical fibre obliquely. Other known techniques include providing an anti-reflection coating on the fibre end face, or roughening the fibre end face so as to minimise Fresnel reflection as taught in U.S. Pat. No. 5,479,549. These techniques do not provide any focusing of the optical radiation, and thus, while they may reduce the level of back reflection to some extent, the coupling efficiency between the laser diode and the optical fibre is low.

It is known to improve the efficiency of coupling by the use of a microlens formed on the tip of the optical fibre. This technique is particularly effective since the microlens and fibre are permanently aligned, and form a single assembly which can be easily positioned and held in alignment with the laser diode. Particular problems are faced in coupling semiconductor lasers which have asymmetric output radiation patterns to symmetric optical fibres. For example, 980 nm semiconductor lasers, which are used to pump erbium doped fibre amplifiers (EDFAs) have highly elliptical output radiation patterns with aspect ratios of 4:1 and more. Anamorphic optical fibre microlenses have been developed to efficiently couple radiation from such asymmetric sources. A simple wedge-shaped optical fibre microlens is proposed by Shah et al in "Efficient power coupling from a 980 nm, broad area laser to a single mode fibre using a wedge-shaped fibre end face" Journal of Lightwave Technology, Volume 8, No. 9, September 1990, and a double-wedge microlens design is disclosed in U.S. Pat. No. 5,455,879.

These semiconductors lasers with asymmetrical output radiation patterns are also particularly intolerant of back reflection, which can cause significant changes in their output spectra. In the case of high power 980 nm semiconductor lasers utilised to pump EDFAs, any change in output spectrum caused by back reflection could take the emission of the nominally 980 nm pump outside of the absorption band of erbium, and thus render the EDFA susceptible to severe gain fluctuations. These problems are discussed by Giles et al in "Reflection-induced changes in the optical spectra of 980 nm QW lasers" IEEE Photonics Technology Letters, volume 6, No. 8, August 1994. Giles et al propose to improve the immunity to spurious reflections of these lasers by utilising bulk gratings or fibre grating reflectors to provide a controlled narrow band reflection. This suggestion is taken up by Ventrudo et al ("Wavelength and Intensity Stabilisation of 980 nm diode lasers coupled to fibre Bragg gratings" Electronic Letters, Dec. 8, 1994, volume 13, No. 25 and U.S. Pat. No. 5,485,481), who improve the spectral characteristics of commercially available 980 nm pump diode lasers by using optical feedback from fibre Bragg gratings.

According to a first aspect of the present invention there is provided an optical fibre microlens comprising anamorphic focusing means, wherein the major axis of the focusing means is not perpendicular to the longitudinal axis of the optical fibre.

The present invention thus provides a simple, effective technique for simultaneously increasing the coupling efficiency between an optical fibre and a laser diode having an asymmetric output, and reducing the level of back reflection from the microlens to the laser diode. The present Applicants have calculated that a simple wedge-shaped optical fibre microlens, whose tip is at 90° C. to the optical fibre axis (as described by Shah et al) causes a back reflection of approximately −30 dB. This level of back reflection is sufficient to disturb the output spectrum of a 980 nm laser diode. If the tip of the wedge is rounded at all, the level of back reflected radiation will be higher. The present invention seeks to ensure that any radiation reflected from an anamorphic microlens is directed away from the active area of a laser diode, while also maintaining high-coupling efficiency between the laser diode and the optical fibre. In a well designed EDFA the back reflection from the microlens is likely to be the only significant source of back reflection, thus the performance of EDFA's utilising microlens according to the present invention may be enhanced. Furthermore, the present invention also facilitates the accurate and stable alignment of a microlens to a semiconductor laser diode by substantially eliminating Fabry-Perot cavity effects.

The anamorphic focusing means may be circularly cylindrical, essentially comprising a cylindrical lens formed on the end of the optical fibre so that the axis of the cylinder is not perpendicular to the longitudinal axis of the optical fibre. However, preferably, the anamorphic focusing means comprises at least two substantially planar surfaces inclined with respect to each other to form a wedge. In this case, the line of intersection of the two planar surfaces at the tip of the wedge comprises the major axis of the focusing means, and is aligned at an angle of less than 90° C. to the longitudinal axis of the optical fibre.

Preferably, in optical fibre micro lenses, according to embodiments of the present invention, the angle between the line of intersection of the two planar surfaces and the axis of the optical fibre, is less than 89° C. and greater than 75° C., most preferably the angle is substantially 83° C.

The profile of the tip of the wedge, in a plane perpendicular to the line of intersection of the two planar surfaces, may be a triangle. Alternatively, the profile at the tip of the wedge may be curved. Such a curved profile increases the coupling efficiency of radiation to the optical fibre.

Where the profile of the tip of the wedge is curved, advantageously the asymptotes of the curve lie within the two planar surfaces. Most preferably, the curve is substantially hyperbolic.

Preferably, the included angle of the wedge is between 95° C. and 125° C., to ensure optimum coupling.

Advantageously, the tip of the wedge may be truncated in the vicinity of the longitudinal axis of the optical fibre, preferably by a third substantially planar surface inclined at a substantially equal angle to each of the planar surfaces forming the wedge. Such truncation of the wedge allows the active area of the microlens, close to the core of the optical fibre, to more closely approach the facet of the laser diode, thus enhancing coupling efficiency.

According to a second aspect of the present invention, there is provided a source of optical radiation comprising a semiconductor laser diode, having an output facet, and an optical fibre microlens according to the first aspect of the present invention aligned to receive optical radiation output from an active area of the laser diode through the output facet, wherein the level of optical radiation, output from the laser diode, which is reflected back from the microlens to the active area of the laser diode is substantially reduced.

Since the line of intersection of the two planar surfaces of an optical fibre microlens, according to the first aspect of the present invention is not perpendicular to the longitudinal axis of the optical fibre, the light entering the optical fibre in a direction parallel to its longitudinal axis will be refracted in accordance with Snell's Law. Thus preferably, in embodiments of the second aspect of the present invention, the longitudinal axis of the optical fibre is not perpendicular to the output facet of the semiconductor laser diode, so as to ensure that radiation from the laser diode does not strike the optical fibre microlens in a direction parallel to its longitudinal axis. This increases the coupling efficiency of radiation from the laser diode to the optical fibre.

Preferably, the longitudinal axis of the optical fibre makes an angle of between 89° C. and 83° C. with the output facet of the semiconductor laser diode, and most preferably makes an angle of substantially 87° C.

Thus, in embodiments of the present invention, the tip of the wedge of a microlens is aligned away from the perpendicular to the longitudinal axis of the optical fibre, and the longitudinal axis of the optical fibre itself is aligned away from the perpendicular to the facet of the laser diode.

According to a third aspect of the present invention, there is provided a method of forming an optical fibre micolens.

Embodiments of the present invention will now be described, by way of example only, and with reference to the attached drawings, in which.

Figure 1:
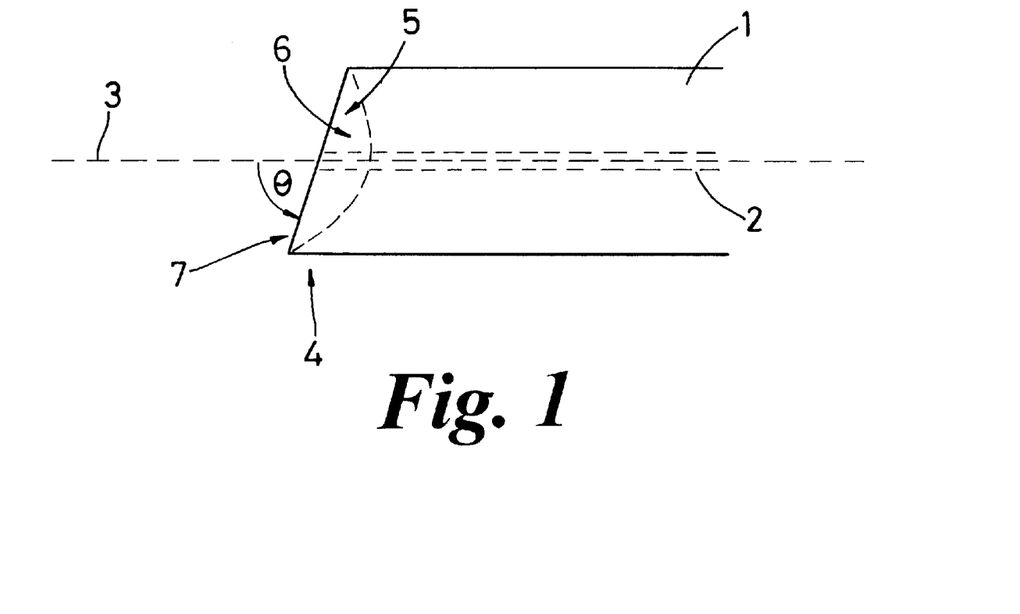
FIG. 1 is a schematic drawing of an optical fibre microlens according to a first embodiment of the present invention.

FIG. 1 shows a schematic drawing of an optical fibre microlens 4 according to an embodiment of the present invention. An optical fibre 1 has a core 2 centred on its longitudinal axis 3. At one end of the optical fibre 1, the fibre is substantially wedge shaped. The wedge shape is formed by two substantially planar surfaces 5 and 6, which meet at a line of intersection 7. The line of intersection 7 makes an angle of θ with the longitudinal axis 3 of the optical fibre 1.

Figure 2:
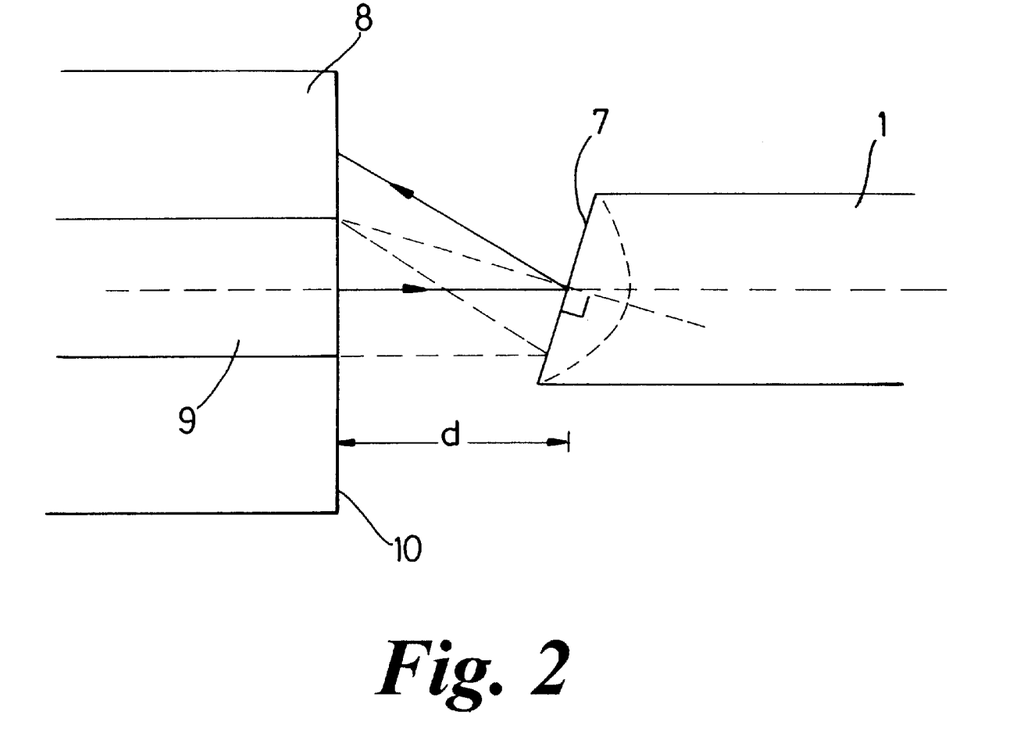
FIG. 2 shows the microlens of FIG. 1 aligned to a laser diode.

The factors which affect the choice of the angle θ will now be discussed with reference to FIG. 2. FIG. 2 is a schematic diagram of a semiconductor laser diode 8, having an active area 9, aligned to an optical fibre microlens 4 according to an embodiment of the present invention. The ouput radiation pattern of the semiconductor laser diode 8 is elliptical, its near field mode having a major radius of W, and a minor radius of w. The microlens 4 is aligned to the semiconductor laser diode 8 so that its line of intersection 7 lies within the same plane as the major axis of the near field mode of the laser diode 8 (i.e. the plane of the paper in FIG. 2). The angle θ of the optical fibre microlens 4 is chosen so that at the optimum coupling distance d of the optical fibre and microlens 4 from the semiconductor laser diode 8, any radiation back reflected from the microlens 4 reaches the facet 10 sufficiently far from the active area 9 so as not to disturb the operation of the semiconductor laser diode 8.

Figure 3:
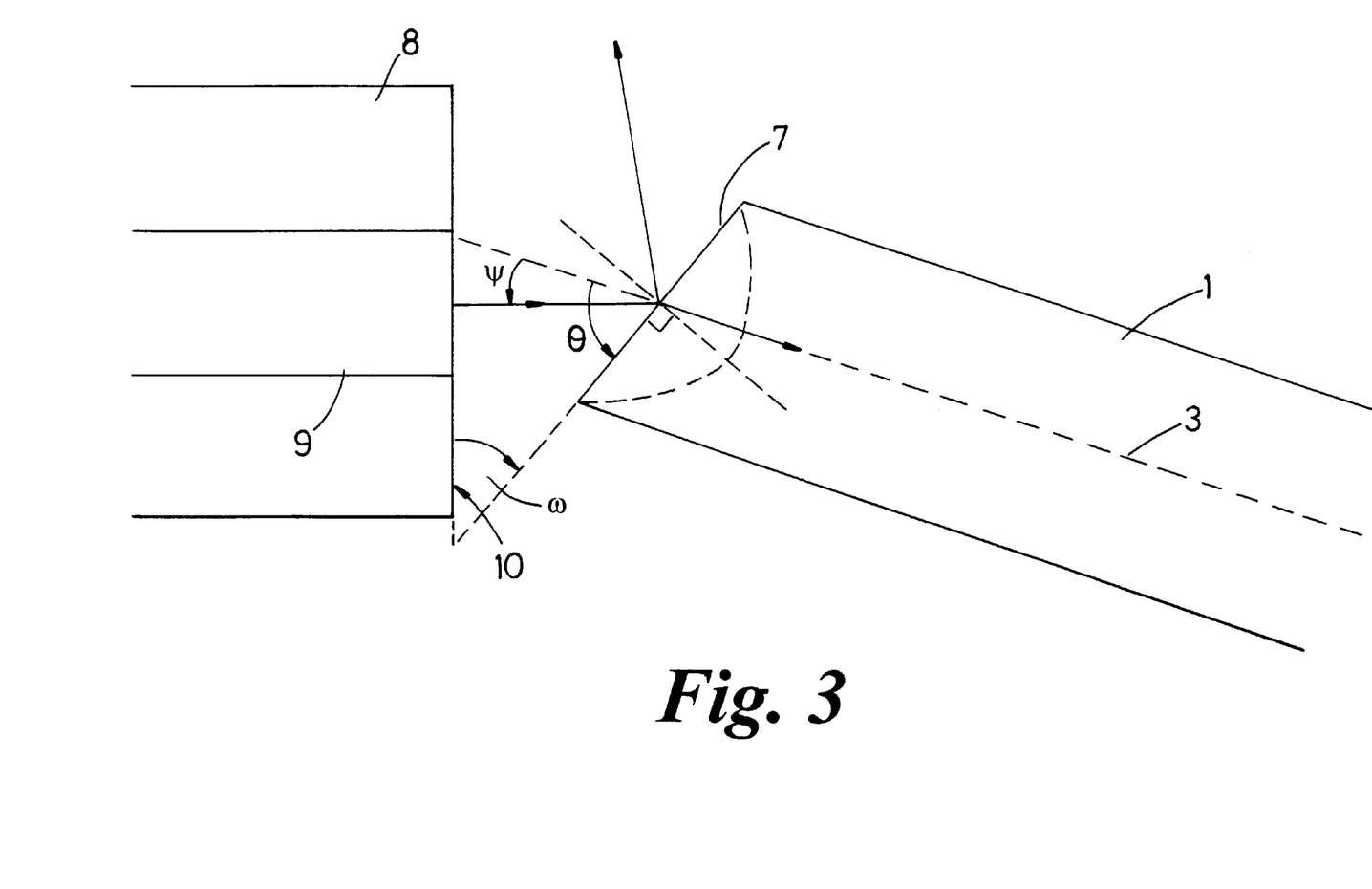
FIG. 3 shows an optical source according to an embodiment of the second aspect of the present invention.

While the arrangement shown in FIG. 2 substantially eliminates any back reflection experienced by the laser diode 8 from the fibre microlens 4, the coupling efficiency of radiation from the laser diode 8 to the optical fibre 1 is not optimum. With reference to FIG. 3, it is thus preferred to tilt the longitudinal axis 3 of the optical fibre 1 at an angle of ψ with respect to the perpendicular to the facet 10 of the laser diode 8. The angle ψ is chosen so that radiation from the laser diode 8 striking the tip 7 of the wedge is refracted into the optical fibre 1 in a direction parallel to the longitudinal axis 3 of the fibre. The angle ψ is thus given by the following equation:

$$n. \cos(\theta) = \cos(\theta - \psi) \quad [1]$$

where n is the refractive index of the optical fibre 1.

The degree of attenuation of radiation coupled back into the near field mode of the semiconductor laser diode 8 from radiation back reflected by the microlens 4 can be estimated from the following equation:

$$I(D, \omega) = \sqrt{\frac{\pi w^2}{2\lambda D}} \exp\left[-\left(\frac{\pi^2 W^2 \sin^2(\omega)}{2\lambda^2}\right)\right] \quad [2]$$

Where ω is the angle between the line of intersection 7 and the laser facet 10, as shown in FIG. 3, and is given by:

$$\omega = 90 - \theta + \psi \quad [3]$$

Figure 11:
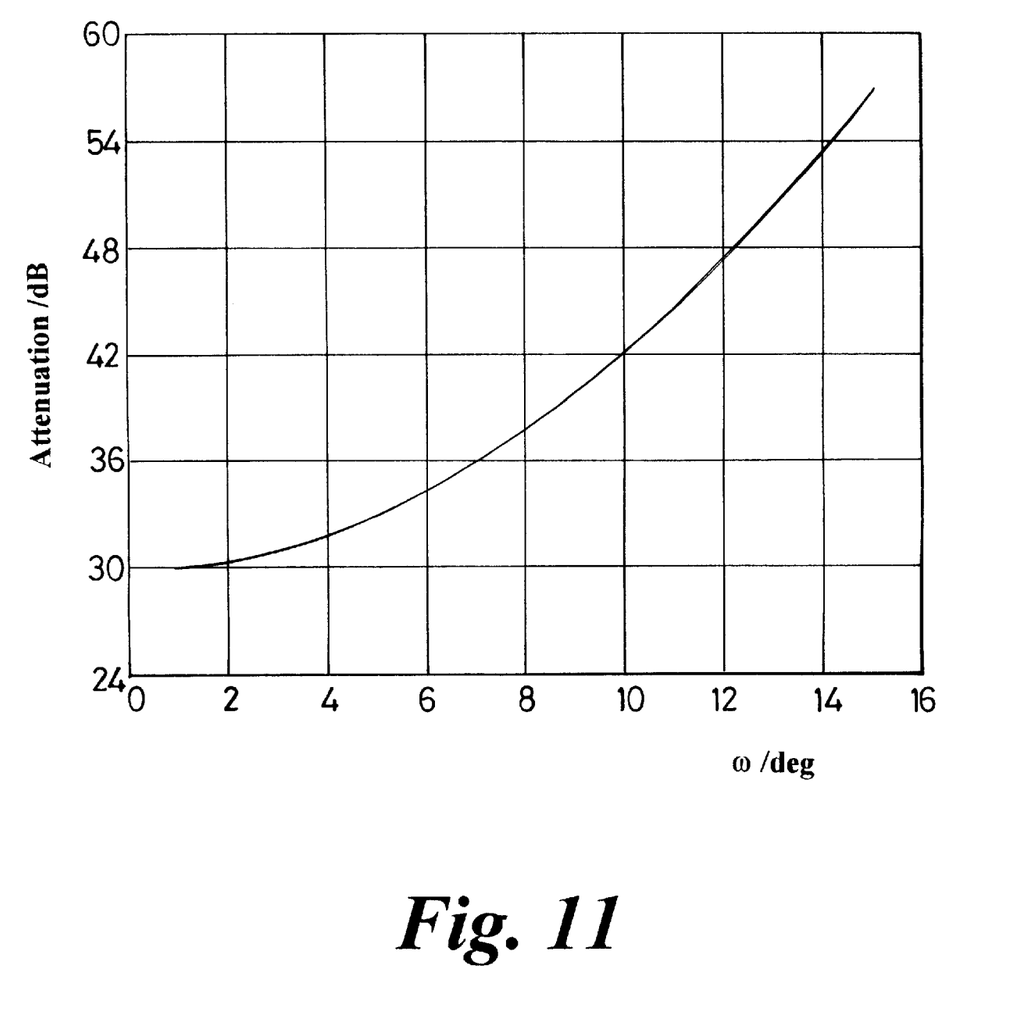
FIG. 11 is a graph of the theoretically calculated attenuation in optical power coupled back from a wedge lens to a 980 nm laser diode as a function of the angle ω between the tip of the wedge and the facet of the laser diode.

Equation [2] is plotted as a function of ω in FIG. 11, for the following typical values for a 980 nm strained MQW laser diode: ω=0.7 μm, W=3.0 μm and D=10 μm.

As can be seen from FIG. 11, the attenuation from a wedge lens aligned perpendicularly to the facet (ω=0) is 30 dB, which is not sufficient to prevent spectral instability in the laser diode. Once the angle ω has been increased to 10° C., the attenuation increases to approximately 42 dB. The applicants have found this level of attenuation to be sufficient to satisfactorily prevent spectral instability in 980 nm laser diodes.

When employing silica optical fibre microlens, for which n is approximately 1.5, optimum values for θ and ψ have been found to be approximately 83° C. and approximately 3° C. respectively.

As will be appreciated by those skilled in the art, different optimum values will exist for laser diodes having different characteristics (e.g. aspect ratio of radiation pattern, wavelength, etc) and these may be determined with the aid of equations [1], [2] and [3].

Figure 4:
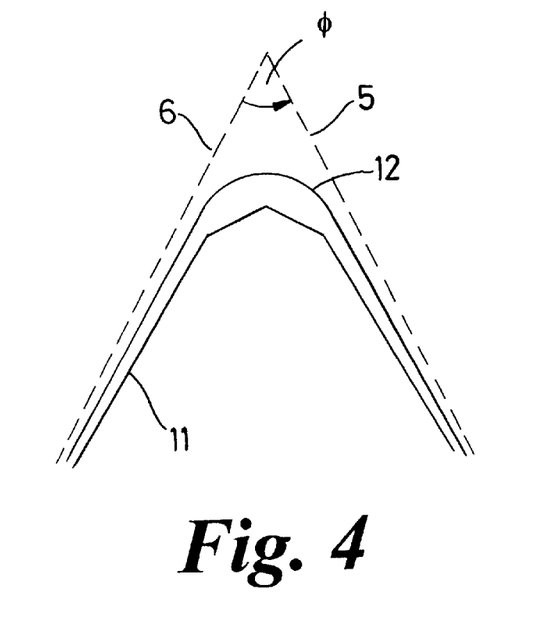
FIG. 4 is a schematic cross-section through the tip of a microlens, showing microlens profiles according to second and third embodiments of the first aspect of the present invention.

Employing the configuration shown in FIG. 3, coupling efficiencies equal to those achievable utilising prior art wedge shaped microlenses can be achieved, while simultaneously eliminating the effect of back reflections from the microlens to the laser diode. With reference to FIG. 4, coupling efficiencies can be further improved by employing a double wedge profile 11, a hyperbolic profile 12; or a circular profile (not shown) for the tip of the wedge. The angle φ between the planar surfaces 5 and 6, known as the wedge included angle, may also be optimised by means known to those skilled in the art.

Figure 5:
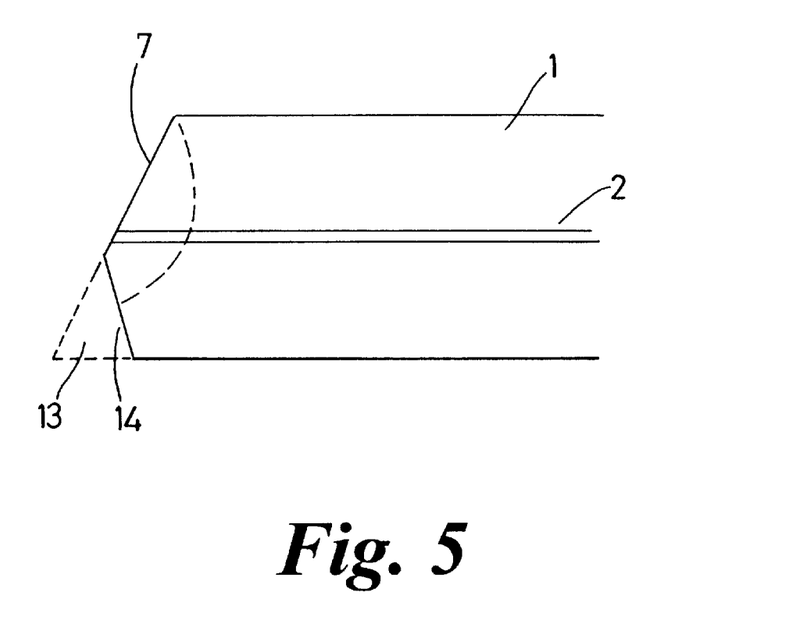
FIG. 5 is a schematic drawing showing a fourth embodiment of the first aspect of the present invention.

A further embodiment of the present invention is illustrated schematically in FIG. 5. The applicants have found that in some circumstances the optimum distance d between the optical fibre microlens 4 and the facet 10 of the laser diode 8 is sufficiently small that there is a risk of collision between the two during alignment (for example the distance d may be as little as 8 μm). It is thus advantageous to truncate the tip of the wedge 13 close to the core 2 of the optical fibre 1. This can be achieved by providing a third planar surface 14, at an equal angle to the planar surfaces 5 and 6.

Figure 6A:
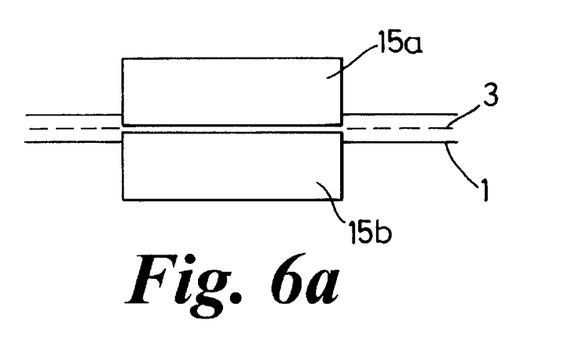
FIG. 6a shows a side elevation of a magnetic holder utilised in the fabrication of microlenses according to embodiments of the present invention.
Figure 6B:
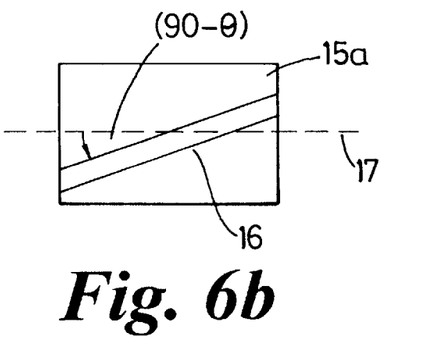
FIG. 6b shows a plan view of the inner surface of one half of such a magnetic holder.
Figure 7A:
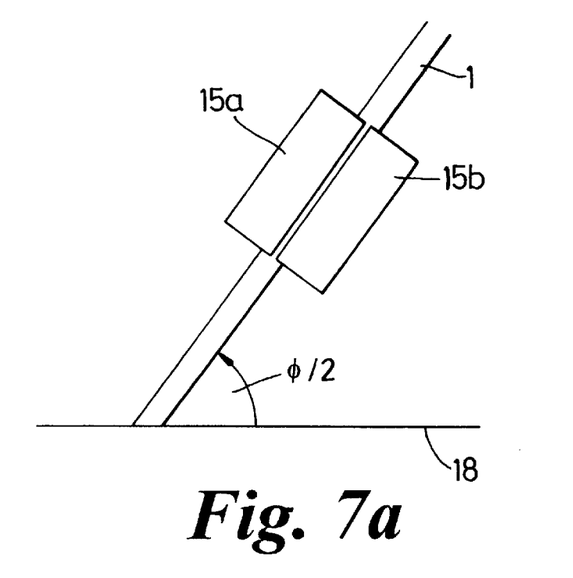
FIGS. 7a and 7b are schematic drawings showing apparatus utilised in the fabrication of microlenses according to embodiments of the present invention, a) in side elevation, and b) in plan view.
Figure 7B:
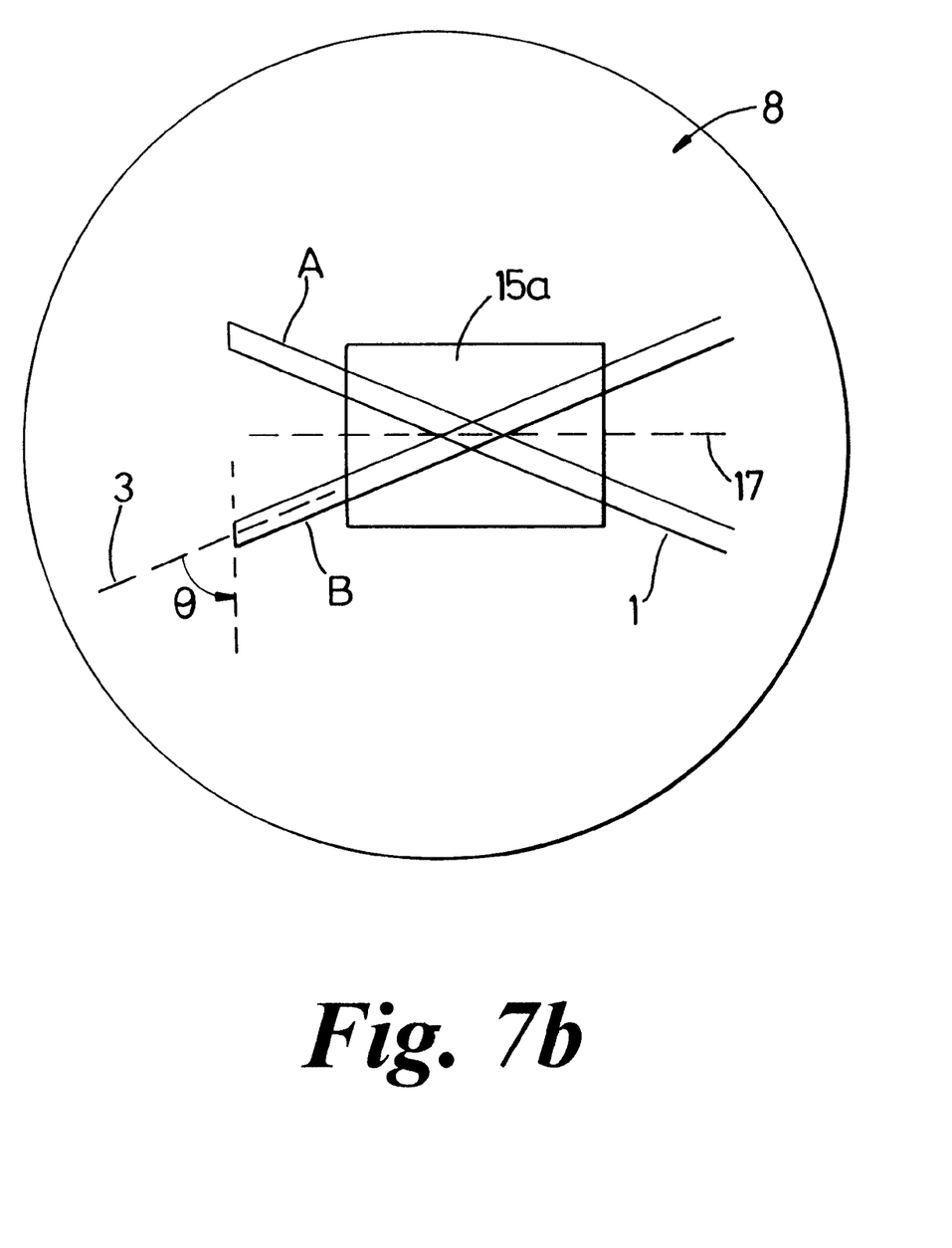

A method of forming optical fibre microlenses according to embodiments of the present invention will now be described, with reference to FIGS. 6 and 7. A magnetic holder 15 is utilised to hold the optical fibre 1, as shown in FIG. 6a. The magnetic holder 15a, 15b comprises two parts, 15a and 15b, between which the optical fibre 1 is held. Each part of the magnetic holder 15a, 15b has a groove 16 sized so as to firmly grip the optical fibre 1. FIG. 6b shows a plan view of the inner face of one magnetic holder part 15a. The groove 16 in the inner surface of the magnetic holder 15a is at an angle of (90−θ) to a longitudinal rotational axis 17 which lies within the inner face of the magnetic holder 15a. The other half 15b of the magnetic holder has a matching groove 16 at the same angle to its rotational axis 17. The optical fibre 1 is placed within a groove 16 in a first part 15a of the magnetic holder. The second part 15b of the holder is placed on top of the first part 15a, so that the optical fibre 1 is firmly held within the groove 16 in the two parts of the holder 15a and 15b. With reference to FIG. 7a, the magnetic holder 15a, 15b is positioned so as to hold the optical fibre 1 against a planar rotating grinding disc 18, so that the angle between the fibre axis 3 and the plane of the grinding disc 18 is one half of the desired wedge included angle φ. Once one of the planar surfaces 5 of the wedge has been ground, the magnetic holder 15a, 15b is rotated through 180° C. about its longitudinal axis of rotation 17 (from position A to position B in FIG. 7b) and is again positioned so that the fibre axis 3 makes the same angle φ/2 to the grinding disc 18 so as to form the second planar surface 6 of the wedge. The desired angle θ, between the line of intersection 7 of the planar surfaces 5 and 6 of the wedge and the longitudinal axis 3 of the optical fibre 1, is ensured due to the angle between the groove 16 and the rotational axis 17 of the magnetic holder 15.

Figure 8A:
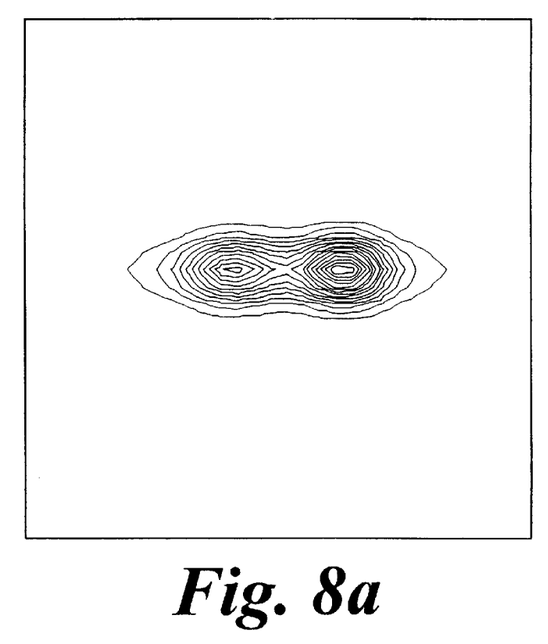
FIGS. 8a and 8b are contour plots showing the farfield pattern output through a microlens according to the present invention when a) the microlens is not correctly formed, and b) the microlens is correctly formed.
Figure 8B:
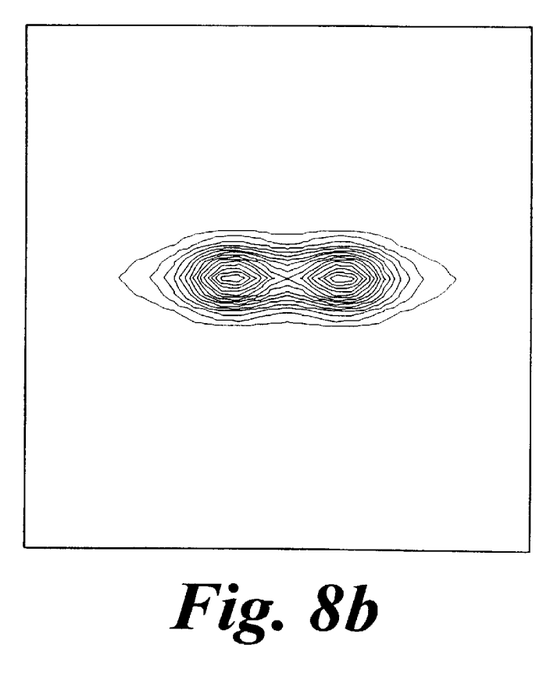

In order to ensure that the intersection 7 of the two planar surfaces 5 and 6 passes through the centre of the core 2 of the optical fibre 1, the grinding process is repeated, alternating between grinding surface 6 and surface 5, and an optical check on the position of the line of intersection 7 is carried out between each grinding step. The optical check comprises launching radiation from a 980 nm laser into the remote end of the optical fibre 1, and monitoring the farfield pattern emitted from the microlens with a CCD camera and monitor. FIG. 8a shows an asymmetrical farfield pattern which indicates that the line of intersection 7 is not centrally positioned across the core 2 of the optical fibre 1. FIG. 8b is a symmetrical farfield pattern indicating that the line of intersection 7 is now centrally located across the core 2.

Figure 9:
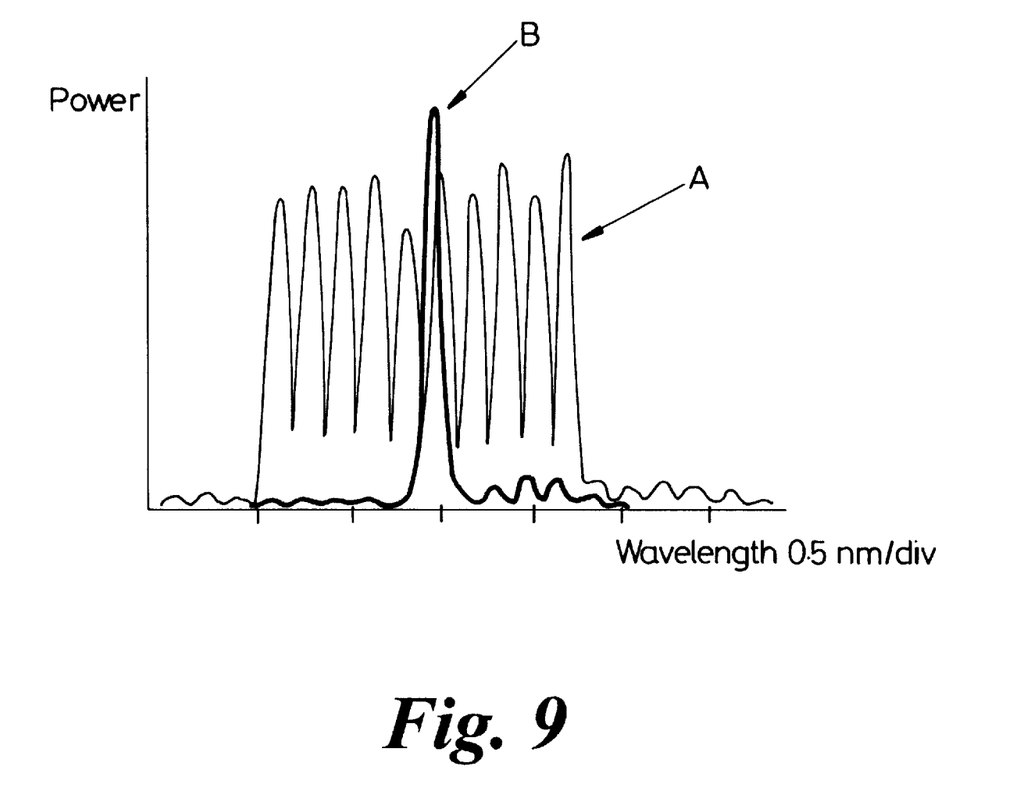
FIG. 9 shows experimentally obtained power against wavelength curves for a 980 nm laser diode coupled to a prior art simple wedge lens (curve A), and coupled to a microlens according to the first embodiment of the present invention (curve B)

In order to demonstrate the effect of optical fibre microlenses according to embodiments of the present invention on the output spectrum of a laser diode, the optical spectrum of the same 980 nm laser diode when coupled to a prior art simple wedge lens, and when coupled to a microlens according to the present invention has been measured. FIG. 9 shows the power against wavelength curve A obtained from an optical spectrum analyser over a period of 1 minute for the prior art wedge lens, and the curve B obtained for a microlens according to the present invention. The optical spectrum analyser was set so as to sweep 200 times across the wavelength band of the laser diode within a 1 minute period, and to retain the maximum power measured at each wavelength. From curve A it can be seen that the laser diode, when coupled to a prior art wedge lens, mode hopped between 10 distinct longitudinal modes over a range of approximately 2 nm during the measurement period. Whereas curve B, showing the output spectrum when the laser diode is coupled to a microlens according to the present invention, shows that the output remained within the same longitudinal mode for the whole of the period of the measurement. Such mode hopping as exhibited when coupled to the prior art wedge lens is particularly problematic when a laser diode is utilised to pump rare earth amplifiers such as erbium doped fibre amplifiers. Even if the power output of the laser diode is the same in all modes, because the absorption co-efficient of erbium varies with wavelength (dropping by approximately 10% at 5 nm away from the peak wavelength), the gain or output power of an EDFA will vary as the laser diode pump wavelength varies. This variation in gain in the EDFA will cause undesirable modulation in the signal being amplified by the EDFA.

Figure 10A:
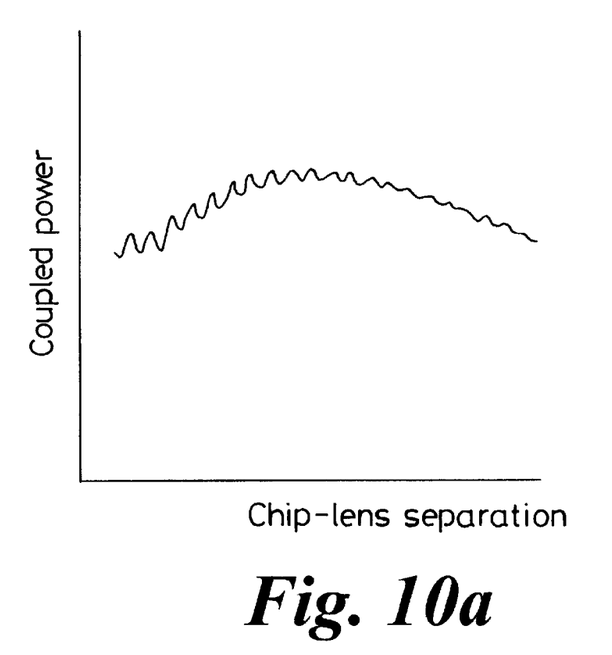
FIGS. 10a and 10b show the variation in optical power coupled to an optical fibre from a 980 nm laser diode as the microlens to laser diode distance is varied for a) a prior art simple wedge lens and b) a microlens according to the first embodiment of the present invention.
Figure 10B:
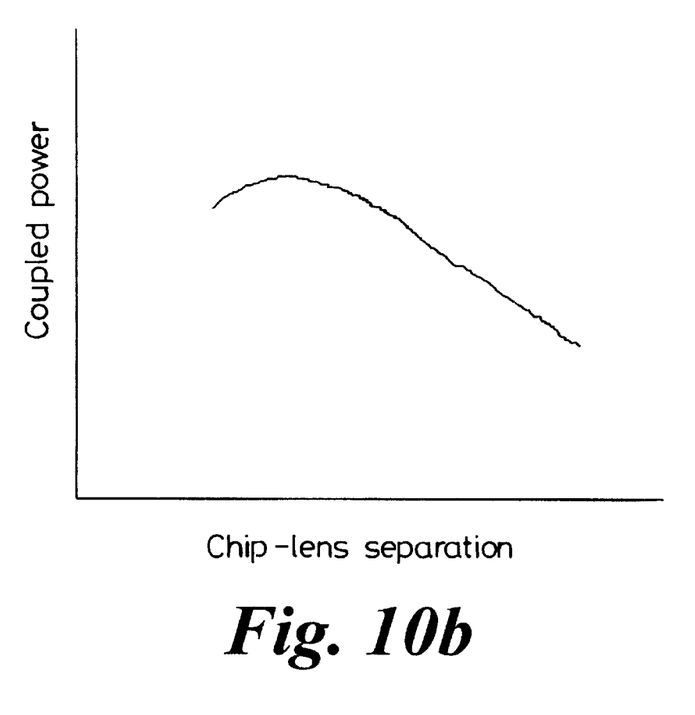

A further advantage given by optical fibre microlenses according to embodiments of the present invention is the elimination of Fabry-Perot cavity effects when aligning the microlens to a laser diode. FIG. 10a and b show the variation in optical power coupled to an optical fibre as a function of the distance between the microlens and the laser diode for a prior art wedge lens and for a microlens according to the present invention respectively. Back reflections from the tip of the prior art wedge lens into the laser diode cause a variation in the coupled power due to the weak Fabry-Perot cavity formed between the lens tip and the front facet of the laser diode. This weak Fabry-Perot cavity superimposes a ripple, in this case of about 5% amplitude on the curve of coupled power against lens facet distance. This ripple causes difficulty in initially aligning the optical fibre microlens to achieve optimum coupling, since there are many local, false maxima. Furthermore in a fully packaged optical source small variations in the distance between the optical fibre microlens and the laser diode, for example due to temperature changes, will lead to far greater fluctuations in the power coupled to the optical fibre due to these ripples. As can be seen from FIG. 10b, when a microlens according to the present invention is employed the variation in coupled power with microlens to laser diode distance is smooth, and shows no sign of Fabry-Perot cavity ripples. This enables the optimum coupling distance to be achieved reliably and accurately, and ensures that in service variations in coupled power are minimised.

I claim:

1. An optical fibre microlens comprising anamorphic focusing means integrally formed on an end of said optical fibre, said anamorphic focussing means having a major axis that is non-perpendicular to a longitudinal axis of the optical fibre.

2. An optical fibre microlens as claimed in claim 1, wherein the anamorphic focusing means is substantially circularly cylindrical and the major axis of the focusing means comprises the axis of the cylinder.

3. An optical fibre microlens as claimed in claim 1, wherein the anamorphic focusing means comprises at least two substantially planar surfaces inclined with respect to each other to form a wedge, and the line of intersection of the two planar surfaces at the tip of the wedge comprises the major axis of the focusing means.

4. An optical fibre microlens as claimed in claim 3, wherein the profile of the tip of the wedge, in a plane perpendicular to the line of intersection of the two planar surfaces, is curved.

5. An optical fibre microlens as claimed in claim 4, wherein the asymptotes of the profile of the tip of the wedge lie within the two planar surfaces.

6. An optical fibre microlens as claimed in claim 4, wherein the profile is substantially hyperbolic.

7. An optical fibre microlens as claimed in claim 4, wherein the profile is substantially circular.

8. An optical fibre microlens as claimed in claim 3, wherein the angle ($\phi$) between the two planar surfaces is between 95° C. and 125° C.

9. An optical fibre microlens as claimed in claim 3, wherein the tip of the wedge is truncated in the vicinity of the longitudinal axis of the optical fibre.

10. An optical fibre microlens as claimed in claim 9, wherein the tip of the wedge is truncated by a third substantially planar surface inclined at a substantially equal angle to each of the at least two substantially planar surfaces.

11. An optical fibre microlens as claimed in claim 1, wherein the angle ($\theta$) between the major axis of the focusing means and the axis of the optical fibre is less than 89° C. and greater than 75° C.

12. An optical fibre microlens as claimed in claim 11, wherein the angle ($\theta$) between the major axis of the focusing means and the axis of the optical fibre is substantially 83° C.

13. A source of optical radiation comprising a semiconductor laser diode, having an output facet, and an optical fibre microlens as claimed in claim 1, aligned to receive optical radiation output from an active area of the laser diode through the output facet, wherein the level of optical radiation, output from the laser diode, which is reflected back from the microlens to the active area of the laser diode is substantially reduced.

14. A source of optical radiation as claimed in claim 13, wherein the longitudinal axis of the optical fibre is not perpendicular to the output facet of the semiconductor laser diode.

15. A source of optical radiation as claimed in claim 14, wherein the longitudinal axis of the optical fibre makes an angle (90−$\psi$) of between 89° C. and 83° C. with the output facet of the semiconductor laser diode.

16. A source of optical radiation as claimed in claim 14, wherein the longitudinal axis of the optical fibre makes an angle (90−$\psi$) of substantially 87° C. with the output facet of the semiconductor laser diode.

17. A source of optical radiation as claimed in claim 13, wherein the angle ($\omega$) between the line of intersection of the two planar surfaces of the microlens and the output facet of the laser diode is between 5° C. and 15° C.

18. A source of optical radiation as claimed in claim 17, wherein the angle ($\omega$) between the line of intersection of the two planar surfaces of the microlens and the output facet of the laser diode is approximately 10° C.

19. A source of optical radiation as claimed in claim 13, wherein the wavelength of the optical radiation output from the laser diode is suitable for pumping a rare earth doped optical fibre amplifier, or laser.

20. A source of optical radiation as claimed in claim 13, wherein the wavelength of the optical radiation output from the laser diode is suitable for pumping an erbium doped optical fibre amplifier, or laser.

21. A source of optical radiation as claimed in claim 13, wherein the wavelength of the optical radiation output from the laser diode is substantially 980 nm.

22. A method of forming an optical fibre microlens on an end of an optical fibre, the method comprising the steps of:
  i) mounting an optical fibre into a holder at an angle (90−$\theta$) to a rotational axis of the holder,
  ii) grinding a first surface on the end of the optical fibre,
  iii) rotating the holder through substantially 180° C. about its rotational axis, and
  iv) grinding a second surface on the end of the optical fibre.

23. A method as claimed in claim 22, comprising the further steps of:
  v) checking the quality of the optical fibre microlens by passing optical radiation through it, and
  vi) repeating steps ii) to v) until the desired quality is achieved.

* * * * *

UNITED STATES PATENT AND TRADEMARK OFFICE
CERTIFICATE OF CORRECTION

PATENT NO. : 5,940,557
DATED : August 17, 1999
INVENTOR(S) : Andrew T. Harker

It is certified that error appears in the above-identified patent and that said Letters Patent is hereby corrected as shown below:

Claim 8, Col. 7, line 35 erroneously reads:

"between 95° [C.] and 125° [C]."

Please correct to read:

"between 95° and 125°."

Claim 11, Col. 7, lines 45 and 46 erroneously read:

"means and the axis of the optical fibre is less than 89° [C.] and greater than 75° [C]."

Please correct to read:

"means and the axis of the optical fibre is less than 89° and greater than 75°."

Claim 12, Col. 7, line 49 erroneously reads:

"means and the axis of the optical fibre is substantially 83° [C]."

Please correct to read:

"means and the axis of the optical fibre is substantially 83°."

Claim 15, Col. 8, line 11 erroneously reads:

"angle (90 -Ψ) of between 89° [C.] and 83° [C.] with the output"

Please correct to read:

"angle (90 -Ψ) of between 89° and 83° with the output"

UNITED STATES PATENT AND TRADEMARK OFFICE
CERTIFICATE OF CORRECTION

PATENT NO. : 5,940,557
DATED : August 17, 1999
INVENTOR(S) : Andrew T. Harker

It is certified that error appears in the above-identified patent and that said Letters Patent is hereby corrected as shown below:

Claim 16, Col. 8, line 15 erroneously reads:

"angle (90 -Ψ) of substantially 87° [C.] with the output of"

Please correct to read:

"angle (90 -Ψ) of substantially 87° with the output of"

Claim 17, Col. 8, line 20 erroneously reads:

"the laser diode is between 5° [C.] and 15° [C.]"

Please correct to read:

"the laser diode is between 5° and 15°."

Claim 18, Col. 8, line 24 erroneously reads:

"the laser diode is approximately 10° [C.]"

Please correct to read:

"the laser diode is approximately 10°."

UNITED STATES PATENT AND TRADEMARK OFFICE
CERTIFICATE OF CORRECTION

PATENT NO. : 5,940,557
DATED : August 17, 1999
INVENTOR(S) : Andrew T. Harker

It is certified that error appears in the above-identified patent and that said Letters Patent is hereby corrected as shown below:

<u>Claim 22, Col. 8, line 41 erroneously reads:</u>

"iii) rotating the holder through substantially 180° [C.] about"

<u>Please correct to read:</u>

"iii) rotating the holder through substantially 180° about"

Signed and Sealed this

Twenty-ninth Day of May, 2001

Attest:

NICHOLAS P. GODICI

*Attesting Officer*　　　*Acting Director of the United States Patent and Trademark Office*